R. W. Andrews.
Shedding.
No. 2,928. Reissued May 12, 1868.
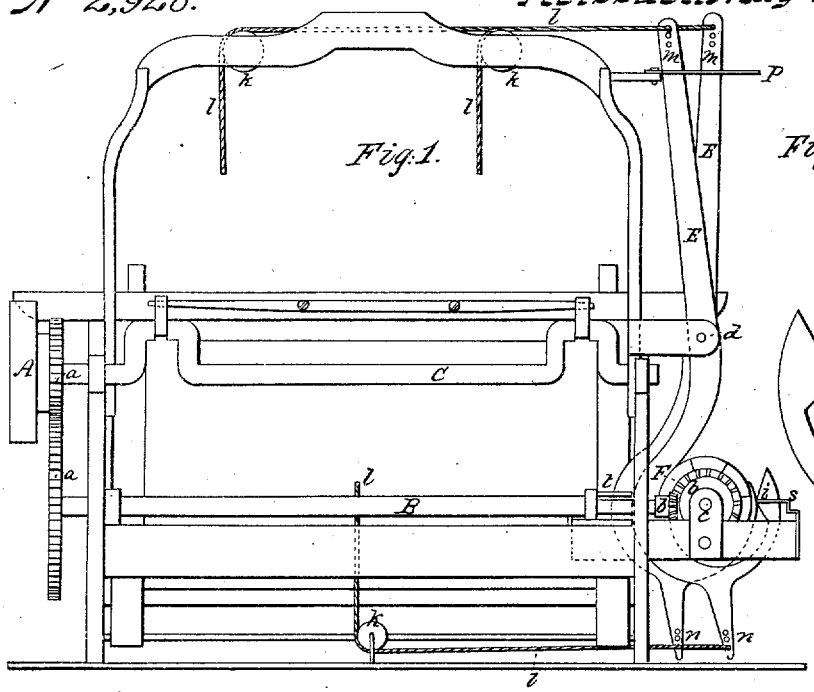
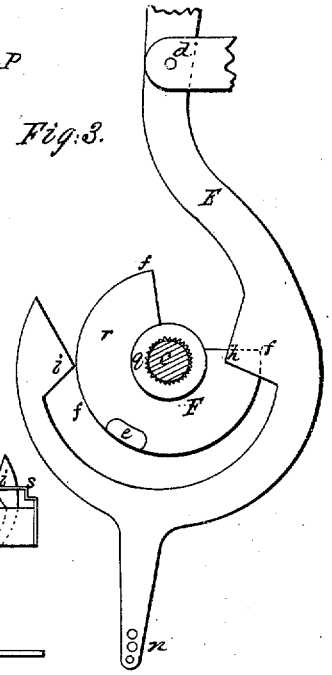
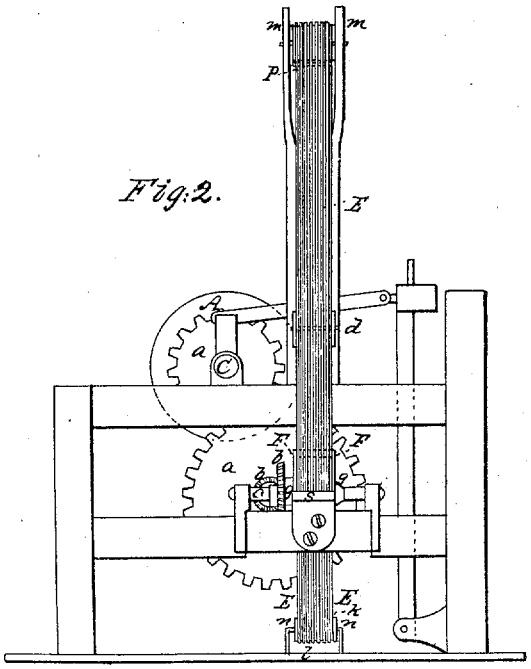
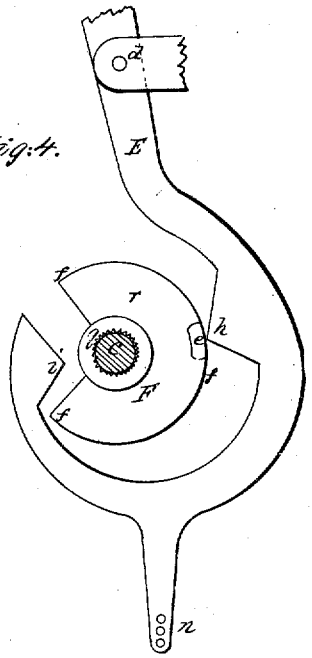
N. PETERS, PHOTO-LITHOGRAPHER, WASHINGTON, D. C.

United States Patent Office.

ROBERT W. ANDREWS, OF STAFFORD, CONNECTICUT.

*Letters Patent No.* 9,540, *dated January* 18, 1853; *extended seven years; reissue No.* 2,928, *dated May* 12, 1868.

IMPROVEMENT IN OPERATING THE TREADLES OF LOOMS.

The Schedule referred to in these Letters Patent and making part of the same.

TO ALL WHOM IT MAY CONCERN:

Be it known that I, ROBERT W. ANDREWS, of Stafford, in the county of Tolland, and State of Connecticut, have invented certain Improvements in Power-Looms; and I do hereby declare that the following is a full and exact description thereof, reference being had to the accompanying drawings, making part of this specification—

Figure 1 being a front elevation of such parts of a power-loom as are necessary to exhibit my improvement and its action.

Figure 2, end elevation of the same, and

Figures 3 and 4 side views of a cam and treadle in different relative positions.

Like letters designate corresponding parts in all the figures.

The loom is operated by means of power applied to a pulley, A, on the main shaft C. A shaft, B, situated below said shaft C, and driven thereby, through the cog-wheel *a a*, in turn drives, through bevel-gear *b b*, a shaft, *c*, on which the cams F F, &c., are placed for operating a series of treadles, E E, &c., whose vibratory movements upon a common fulcrum, *d*, operate the harnesses by means of lines *l l*, &c., passing from their extremities *m n* around pulleys *k k*, &c., at the bottom and top of the loom to said harnesses, in the usual manner.

My invention consists partly in operating each treadle, E, by means of a mover, F, having two outwardly-acting cam surfaces, *e*, *r*, of unequal lengths, combined in one piece in such a manner that the position of the said mover upon its arbor can be reversed for the purpose of doubling its capacity for producing different movements and retentions of the treadle, substantially as hereinafter set forth, and partly in the arrangement of the cam-wheels upon the outside of the loom-frame with the levers hung nearly in the vertical plane of the series of cams or cam-wheels.

The treadles will be moved positively, smoothly, uniformly, and gradually in both directions. The permutations in the figure of the fabric woven may be doubled without additional machinery, and the cams and treadles may occupy much less space than would be possible by any other means, in the manner hereinafter fully set forth.

Each treadle is curved so as to embrace its mover, (as shown in figs. 3 and 4,) and has on the inner periphery of said curved portion two projections or shoes, *h i*, whose central points are located on opposite sides of and in the same line with the centre of the cam-shaft *c*, and against which the cam-surfaces of the mover act in vibrating the treadle. Each mover has a central hub, *q*, of the required thickness, and two cam-plates, *e r*, outside of the same, each being of one-half the thickness of the hub, and both firmly united or forming one solid piece, the outer peripheries of which plates are of the same radius, and respectively act against the shoes *h i* of the treadle. The plate *r* forms nearly an entire disk, having only a gap in its periphery, *f f f*, of sufficient width to receive its shoe during the time that the plate *e*, which is of small extent, is acting against its shoe. The unequal sizes of the cam-plates, as shown in the drawings, and described above, cause the treadle to remain at one limit of its vibration longer than at the other; but their relative sizes may be varied at pleasure. They are so arranged, in reference to one another and the shoes of the treadle, that, at the moment when one commences the other begins to lessen its action on its shoe, so that one or the other is incessantly operating to draw or keep the treadle in one or the opposite direction, each during a relative length of time proportional to the length of its outer periphery.

As represented in figs. 3 and 4, the small cam-surface *e* actuates the shoe *h*, and the large cam-surface *r* actuates the shoe *i*, but both the movers are so constructed that they may be reversed upon their shaft, the cams then operating exactly in the same manner, except that, when so reversed, neither cam-surface acts on the same shoe as before, whereby the movement of the treadle is reversed, and a new figure of the fabric woven produced.

This capability of being reversed without adjustment is peculiar to my double cam-mover and treadle, not being possessed by any others known to me.

A gap in the curved portion of each treadle, above and between the shoes *h i*, wide enough to admit the mover, enables me to reverse the position of either mover or treadle without detaching or disturbing the other movers or treadles. Sets of finger-guides, *s* and *t*, embrace respectively the several shoes *h* and *i* of all the treadles, and hold them precisely opposite their respective cam-plates.

This arrangement also enables me to construct the treadles and movers very thin, and thus greatly economize the space which they occupy. Each treadle and its shoes may be of the thickness of each cam-plate of a mover, and one of the shoes be slightly curved, so that the finger-guides *s t* will bring both shoes opposite their respective cam-surfaces of the mover, or each treadle may have the same thickness as the mover, and each shoe one-half the thickness thereof. I usually employ the former method, as simpler and otherwise preferable.

Each mover may be placed at any angle on the cam-shaft *c*, so that by the permutations of their positions, almost an endless variety of figures may be produced in the fabric woven. The central aperture of each cam-mover may be smooth, and turn freely on the shaft when not tightened thereon; but I prefer to have it grooved, (as shown in figs. 3 and 4,) one of which grooves will always fit over a longitudinal ridge on the shaft, and thereby prevent the possibility of the mover turning from its position. They are all tightened in contact with one another on the cam-shaft, by nuts *g g*, (fig. 2,) which are screwed firmly against the two outer movers.

In cam-looms of this class, as heretofore constructed, the cams have been arranged within the loom-frame, and the levers on the outer side thereof, the connections of the levers with the cams being effected through arms projecting from the levers.

In my construction I place the cams on the outer side of the frame, and hang the levers in vertical line therewith, thereby not only bringing these parts into more compact position, but enabling the cams and levers to relatively work to much better advantage.

I claim the combination in a loom of the harness-frames and cords with the treadles and treadle-cams, constructed and operating substantially as described.

Also the treadles and the movers or cams, combined, constructed, and arranged so that by reversal of the cams upon the shaft, a reversal of the movements and retentions of the harness-frames is produced, substantially as herein set forth.

Also in a cam-loom having upright treadles or harness-levers strung to the harness-leaves or frames, and actuated by a single set of cam-wheels, the arrangement of the fulcrum-shaft of the harness-levers directly over or within the vertical plane of the cam-wheels, substantially as described.

ROBERT W. ANDREWS.

Witnesses:

JOSEPH HYDE,

H. E. CHAMBERLIN.